United States Patent Office 3,157,686
Patented Nov. 17, 1964

3,157,686
DIOL ESTERS OF DITHIOPHOSPHORYLACETIC ACIDS AND PROCESS FOR THEIR PRODUCTION
Heinz Pohlemann and Heiner Dickhaeuser, Ludwigshafen (Rhine), and Richard Sehring, Ingelheim (Rhine), Germany, assignors to Badische Anilin- & Soda-Fabrik Aktiengesellschaft, Ludwigshafen (Rhine), Germany
No Drawing. Filed Dec. 18, 1962, Ser. No. 245,371
Claims priority, application Germany, Dec. 23, 1961, B 65,330
4 Claims. (Cl. 260—461)

This invention relates to the production of esters of O,O-dialkyldithiophosphoric acid with dihydric alcohols. More particularly, the invention relates to the production of esters of the said acid with glycol.

It is known to prepare O,O-dialkyldithiophosphorylacetic acid alkyl esters by reacting O,O-dialkyldithiophosphoric acid salts with chloroacetic acid alkyl esters. The disadvantage of this method is that the chloroacetic acid esters required must be prepared separately, and chloroacetic acid and its esters are very unpleasant owing to their aggressiveness.

We have now found that dithiophosphoric acid esters of the general formula:

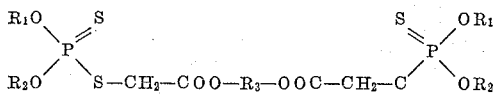

in which $R_1$ denotes an alkyl radical, $R_2$ denotes an alkyl radical and $R_3$ denotes a linear or branched alkylene radical can be prepared while avoiding the said disadvantage by reacting a dithiophosphorylacetic acid of the general formula:

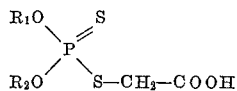

in which $R_1$, $R_2$ and $R_3$ have the above meanings with a diol.

The only initial materials required for this reaction are the dithiophosphorylacetic acid and a diol, and both of these are readily accessible. Dithiophosphorylacetic acids may readily be prepared in conventional manner from phosphorus pentasulfide, an alcohol $R_1OH$ and $R_2OH$ and chloroacetic acid. None of the phosphoric esters occurring as intermediates need be isolated in substance, and this involves great technical advantages having regard to the toxicity and offensive odor of such phosphorus compounds.

It is particularly surprising that the esterification of O,O-dialkyldithiophosphorylacetic acids proceeds so smoothly and with yields of more than 90%, because at least partial decarboxylation of these substituted acetic acids during heating for several hours would have been expected. Furthermore, replacement of the alkoxy groups on the phosphorus by diol radicals would have been expected.

Conventional procedure may be followed for the production of the dithiophosphorylacetic acids required as initial material, by first allowing an alcohol in a diluent, for example benzene, toluene, methylene chloride or carbon tetrachloride, to act on phosphorus pentasulfide. The O,O-dialkyldithiophosphoric acid thus formed is then reacted with a chloroacetate or with chloroacetic acid with the addition of an acid-binding agent. For example alkali hydroxides, alkali carbonates, alkali bicarbonates or pyridine or tertiary amines may be used as acid-binding agents. Furthermore the dialkyldithiophosphoric acids may be transferred by treatment with an aqueous solution of a strongly alkaline compound, from the organic solvent into the aqueous solution, the organic solvent with any impurities dissolved therein then separated and the aqueous solution further reacted with chloroacetic acid; the dialkyldithiophosphorylacetic acid thus formed is then taken up in an organic solvent.

The crude acid thus obtained is then esterified with a diol according to this invention without further purification. This esterification may be carried out with an equivalent amount, i.e., one mole of diol to two moles of dithiophosphorylacetic acid, or with an excess of diol. The reaction proceeds without any catalyst but more rapidly by adding one of the conventional esterification catalysts, for example hydrogen chloride, sulfuric acid, chlorosulfonic acid or an organic sulfonic acid. It is advantageous to work in an organic solvent, for example a hydrocarbon such as benzene or toluene or a chlorohydrocarbon, with which the water of reaction formed can be continuously removed from the mixture at the same time. The reaction temperature is advantageously at 20° to 140° C., especially at 70° to 120° C.

The following are examples of suitable diols: ethylene glycol, propylene glycol, propanediol-1,3, butanediol-2,3, butanediol-1,4 and hexanediol-1,6.

O,O-dialkyldithiophosphorylacetic acid esters are obtained in good yields and with high purity by the process according to this invention. The compounds may be used as intermediates for the production of plant protection agents. Thus the esters, if desired direct from the reaction solution without isolating the pure substances, may be reacted with amines of the formula $NHR_4R_5$, in which $R_4$ denotes hydrogen or an alkyl or aryl radical, $R_5$ denotes hydrogen or an alkyl or aryl radical, or $R_4$ and $R_5$ together with the nitrogen form a heterocyclic radical, to form O,O-dialkyldithiophosphorylacetamides of the formula:

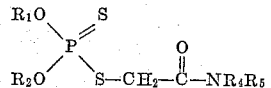

Such compounds are known to be very active insecticides.

The invention is illustrated by, but not limited to, the following examples, the parts being by weight.

Example 1

870 parts of 36.3% dimethyldithiophosphoric acid, dissolved in toluene, is neutralized in the usual way with 400 parts of 20% aqueous caustic soda solution and the two layers are separated. 225 parts of monochloroacetic acid and 250 parts of benzene are added to the aqueous solution of the sodium salt. The whole is heated to 50° C. and condensation sets in with a rise in temperature to 58° to 60° C. After the reaction has subsided, stirring is continued at 50° C. for another two hours. The whole is cooled, another 250 parts of benzene added, the aqueous phase separated and the organic layer washed with 200 parts of water. To the sharply separated benzene solution, another 500 parts of benzene, 68 parts of ethylene glycol and 5 parts of concentrated sulfuric acid are added. The mixture is boiled with a water separator until no more water of reaction passes over. The whole is cooled, 400 parts of water and 10 parts of sodium bicarbonate are added, the aqueous phase is separated and the benzene solution washed again with 100 parts of water and the solvent is distilled off from the organic layer under reduced pressure.

392 parts of a colorless oil (85% of the theory) remains behind.

The ester thus obtained may readily be converted to an insecticidal substance. For this purpose, 34 parts of methanol is added to the crude ester obtained according to the above example and the whole cooled to −5° C. 190 parts of a 35% aqueous methylamine solution is dripped in at −5° C. to 0° C. within two hours while cooling. Stirring is continued for two hours at 0° to +2° C., 700 parts of toluene is added and the two layers are separated. The organic phase is washed twice, each time with 60 parts of water, and the solvent is then distilled under reduced pressure.

The residue is an almost colorless oil which crystallizes after standing for a short time. The yield is 336 parts having a purity of 93%.

*Example 2*

189 parts of monochloroacetic acid and 250 parts of toluene are added to an about 25% aqueous solution of 360 parts of sodium (O,O-dimethyl)-dithiophosphate and the whole is heated to 50° C. After the first reaction has subsided, the whole is kept at 50° C. for two hours and then cooled to about 20°. 750 parts of toluene is added, the aqueous solution separated and the toluene solution washed with 200 parts of water. 68 parts of ethylene glycol and 5 parts of concentrated sulfuric acid are added to the organic solution and the water of reaction is removed at about 100 mm. Hg by azeotropic distillation and recycling of the organic phase. After the product has been cooled and 200 parts of water has been added, the organic solution is separated, washed until neutral with sodium bicarbonate solution and the toluene distilled off in vacuo.

400 parts of a colorless oil having the refractive index *n* 20/D 1.5390 remains. The compound has the formula

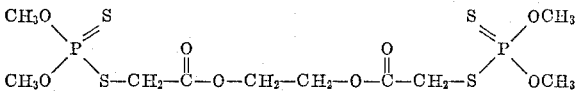

This ester may be converted by the method described in Example 1 into 320 parts of 96% O,O-dimethyldithiophosphoryl-S-(N-methyl)-acetamide.

What we claim is:

1. A compound of the formula

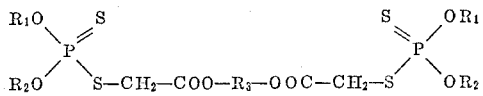

wherein:
$R_1$ and $R_2$ each represent lower alkyl; and
$R_3$ represents the alkylene residue of a 2 to 6 carbon atom diol.

2. The compound of the formula

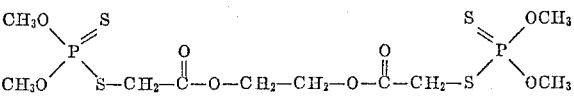

3. A process for the production of a compound having the formula

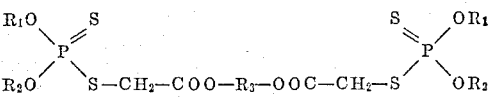

wherein $R_1$ and $R_2$ each represent lower alkyl and $R_3$ represents the alkylene residue of a 2 to 6 carbon atom diol, which process comprises: reacting a compound of the formula

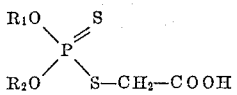

wherein $R_1$ and $R_2$ each represent lower alkyl, with a 2 to 6 carbon atom alkylene-diol in an inert organic solvent at a temperature of about 20° C. to 140° C.

4. A process as claimed in claim 3 wherein the reaction temperature is about 70° C. to 120° C.

References Cited in the file of this patent

UNITED STATES PATENTS

| | | |
|---|---|---|
| 1,534,752 | Watson | Apr. 21, 1925 |
| 2,865,804 | Bavley et al. | Dec. 23, 1958 |
| 2,883,319 | Bavley et al. | Apr. 21, 1959 |
| 2,901,481 | Fusco et al. | Aug. 25, 1959 |